United States Patent [19]

Keller et al.

[11] Patent Number: 4,798,960
[45] Date of Patent: Jan. 17, 1989

[54] DEVICE FOR THE TREATMENT OF SUBSTANCES BY UV RADIATION

[75] Inventors: Heinz Keller; Martin Lehner, both of St. Gall, Switzerland; Reinhard Born, Bruchkobel; Hans-Georg Lotz, Erlensee, both of Fed. Rep. of Germany

[73] Assignee: Ferd. Ruesch AG, Cologne, Fed. Rep. of Germany

[21] Appl. No.: 165,426

[22] Filed: Mar. 1, 1988

Related U.S. Application Data

[63] Continuation of Ser. No. 887,554, Jul. 17, 1986, abandoned.

[51] Int. Cl.[4] ............................ G01J 1/00; G02B 5/24
[52] U.S. Cl. ................................ 250/504 R; 350/1.7; 350/642; 34/4
[58] Field of Search ............. 250/504 R, 493.1, 494.1; 350/1.7, 642; 34/4

[56] References Cited

U.S. PATENT DOCUMENTS

| | | | |
|---|---|---|---|
| 2,914,989 | 12/1959 | Gretener | 350/1.7 |
| 3,686,940 | 8/1972 | Kockott | 250/504 R |
| 3,831,289 | 8/1974 | Knight | 250/504 R |
| 3,944,320 | 3/1976 | McLintic | 350/642 |
| 4,048,490 | 9/1977 | Troue | 250/504 R |
| 4,408,825 | 10/1983 | Stelmack | 350/1.7 |
| 4,563,589 | 1/1986 | Scheffer | 250/504 R |

Primary Examiner—Bruce C. Anderson
Attorney, Agent, or Firm—Kenyon & Kenyon

[57] ABSTRACT

A device for treating material by UV radiation has a UV radiating lamp with a reflector formed by a polished metal reflector having an outer surface of dull black chromium covered by layers of hafnium dioxide and silicon dioxide of which one is bonded to the black chromium surface.

5 Claims, 7 Drawing Sheets

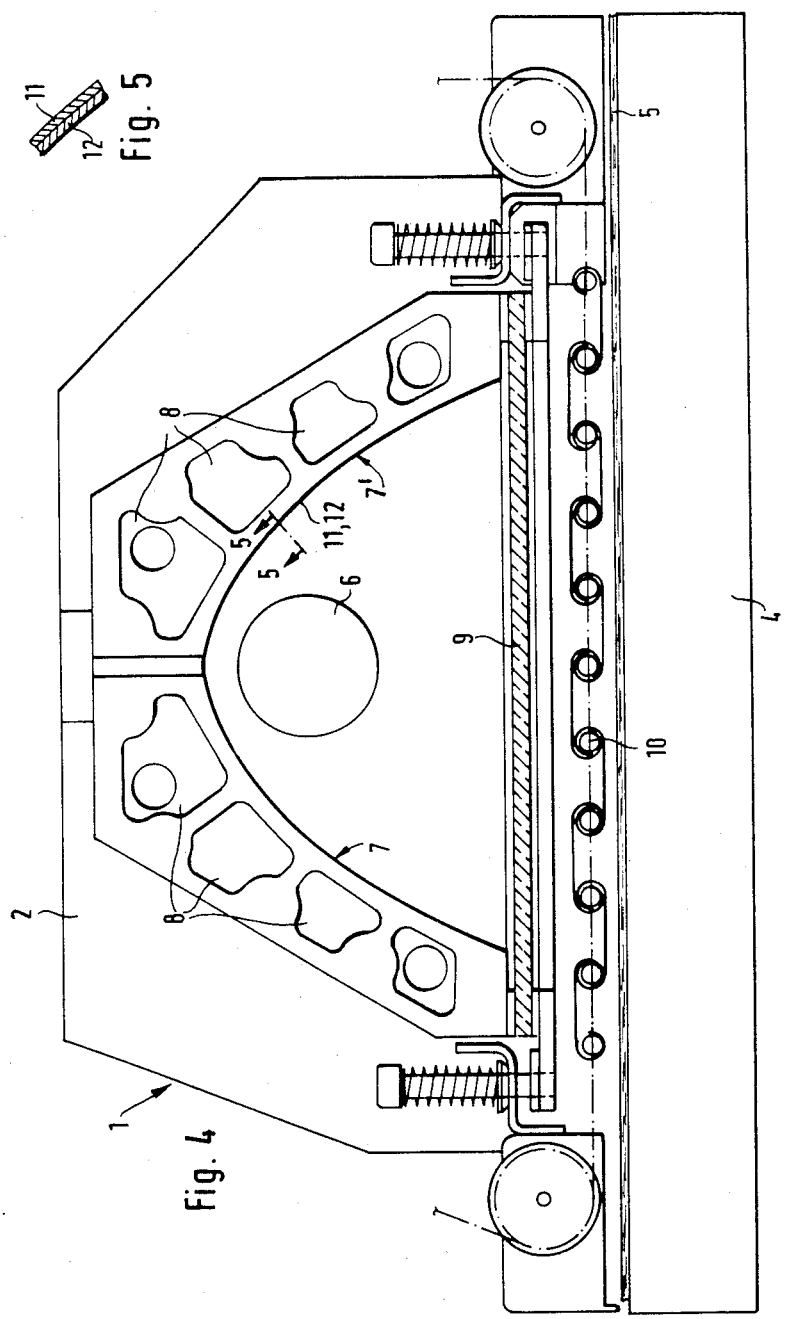

DEVICE FOR THE TREATMENT OF SUBSTANCES BY UV RADIATION

This application is a continuation, of application Ser. No. 887,554, filed July 17, 1986, now abandoned.

The invention relates to a device for the treatment of material by UV radiation, preferably for the drying of surfaces coated with UV lacquers or UV inks, for example for the drying of UV inks immediately after printing in a rotary printing press, and for the radiation of gases and liquids, consisting of a housing comprimising a source of UV radiation and at least one reflecting surface.

In the case of multi-colour rotary printing presses it is necessary to dry the ink applied by one unit before ink can be applied by another printing unit. Therefore, it has been proposed to locate immediately after each printing unit a drying device which for the most part consists of a source of intensive heat.

Conventional drying facilities are not suitable for the drying of the so-called UV inks now being used more and more, because the process is not based on the evaporation of volatile constituents in the ink such as water of solvent but on polymerization under the effects of ultra-violet radiation. Therefore, in order to dry UV inks, light sources are generally proposed which give off as high a proportion of ultraviolet radiation as possible. In such case, commercially available quartz lapms are selected which are surrounded by one or more reflectors in order to direct as much of the 360° radiation as possible from the quartz lamp onto the printed material of paper, plasic sheeting or metal. The reflectors are made from aluminium, anodizes aluminium or stainless steel.

On the one hand, conventional UV radiators have the disadvantage that not only the desired ultra-violet radiation is directed to the selected area of the printed surface either directly or indirectly by the reflectors, but also the entire radiation emitted by the radiation source which covers a large spectral range (approx. 200 to 1,000 nm). Due to the high wall temperature of 650° to 800° C., caused by the high proportion of visible and infra-red radiation above 400 nm, this results in the printed surface becoming very hot and, depending on the type of material, it can lead to expansion and moisture-related warping, distortion of plastic sheeting or scorching of paper so that steps have to be taken to cool the printed surface (maximum safe temperature of the surface 40° C.).

A further drawback results form the fact that, depending on the arrangement and condition of the reflectors, the theoretical proportion of indirect radiation, which can far exceed 50%, cannot be directed onto the printed surface as a result or the limited reflecting capability of the capability of the reflector material. In the order of 250 nanometers (nm) the reflector factor equals 70% for anodized aluminium, 50% for non-anodized aluminium and only 40% for stainless steel.

A further disadvantage to be considered is the speed with which the reflectors age. As a result of the effects of the radiation, the heat and, at the same time, of the vapours and gases rising from the printed surface, condensation water and the ozone created when the quartz lapms are switched on, the reflecting surfaces corrode extraordinarily fast, meaning that the reflection capability is reduced considerably after only a relatively short periode of use. Studies and measurements have shown that, as a result of chlorinated hydrocarbons escaping from the UV inks which split up under the effects or UV rays and heat, thereby giving off chlorine to the atmosphere, hydrochloric acid is formed together with the condensation water which attacks the reflector material. Likewise, the vapours from the roller cleaning agents, which contain trichloroethylene, can cause similar effects.

Measurements have demonstrated that the ultra-violet radiation energy of 9 to 10 wattminutes/m² needed to dry or polymerize fully a UV print on a surface conveyed at 80 m/min. drops below the minimum value after just 300 hours of operation. If the reflectors are not replaced, then the device can only continue to operate at a slower throughput speed, which is not at all economically viable.

It is the aim of the invention to improve conventional UV radiators in such a way that the UV radiation is increased as the total range of longer wave radiation or the spectrum of the source of UV radiation decreases, and thus that the efficiency and service life of the radiators and their reflectors are increased.

The achievement of this aim is embodied by a UV radiator and at least one reflector, whereby the at least one surface of the reflector is provided with a coating of one more layers to reflect the UV radiation of the source of UV radiation and a coating lying thereunder to absorb the range of longer waves of the spectrum of the source of UV radiation.

The reflector comprises preferably two parabolic or eliptical half-shells, because it is very difficult to apply the necessary coatings to heavily curved surfaces.

The half-shells are preferably arranged in a hinged fashion to each other so that the reflected radiation can be focussed correctly.

Aluminium or alloys hereof, copper, brass or steel have proved beneficial for the material to make the parabolic half-shells.

The reflecting layer applied to the absorption layer comprises a numaber of alternating layers of high and low-refraction material which together form a so-called interference filter.

Elox, black chronium, anodized, black nickel and burnished platings have proved beneficial in providing the absorption layer.

The parabolic or eliptical half-shells consist preferably of an aluminium alloy marketed under the tradename "Extrudal 50". The absorption layer consists preferably of several layers of copper and nickel, each or which is polished, and which are applied to the aluminium surface polished beforehand. The polished nickel layer is black chromium plated.

Between the absorption layer and the reflecting layer is preferably arranged a diffuion barrier layer with a physical thickness of at least 0.5 $\mu$.

Preferably the diffusion barrier layer consists of $SiO_2$ because it behaves advantageously as to the optical aspect and further, because there is no need for other coating material than already existing.

The parabolic half-shells are preferably made of "Extrudal 50" consist preferably of a continually cast hollow section, the cavities of which are linked to a cooling system.

The UV radiator comprising two parabolic half-shells around a quartz lamp is preferably provided with a cover at its lower opening which will allow UV radiation to pass through.

The cover comprises preferably quartz glass. It is also beneficial to fit an opaque cover to the lower opening of the UV radiator so that the opening can be covered up quickly in order to cut out the radiation if the line should suddenly stop. It has further provided beneficial to ventilate the inside of the device with a lower cover of quartz glass by feeding in dry and filtered air or an inert gas in a closed or open circuit at slight overpressure in order to be certain of preventing dust, vapours or gases from settling on the reflectors.

In order to explain the invention further, reference is made to a design example of the invention as illustrated in the enclosed drawings and diagrams.

FIG. 4 shows a side view of the device as per the invention;

FIG. 5 shows a section through the coating of the surface of the parabolic half-shell reflectors;

Figure 1:
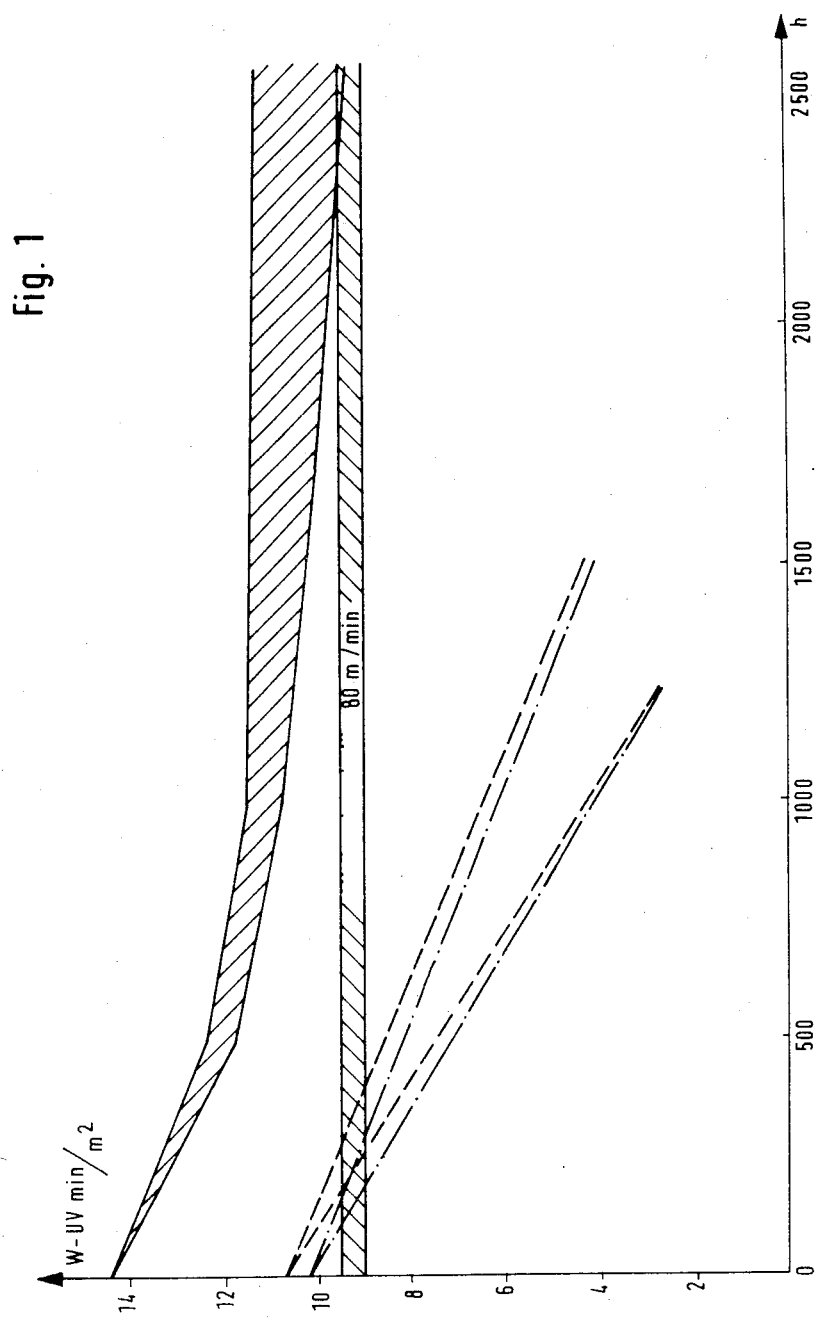
FIG. 1 shows by graphic means a comparison of the efficiency of conventional UV radiators with that of the subject of the invention.

In the graph of FIG. 1 the minimum value for UV radiation required per m² of a surface to be dried is quoted as 9 to 9.5 W for a specific material width and a material speed of 80 m/min. As shown in the two lower curves, which represent the radiation of conventional UV radiators, the minimum value is no longer reached even after just 400 operating hours due to the worsening UV reflection of the reflectors as a result of corrosion. The upper curve represents the amount of radiation emitted by a device as per the invention. Even after 2,500 operating hours this is clearly above the minimum value. The drop in the amount of radiation in this case, however, is not due to corrosion of the reflectors but to a reduction in the output of the quart lamp.

Figure 2:
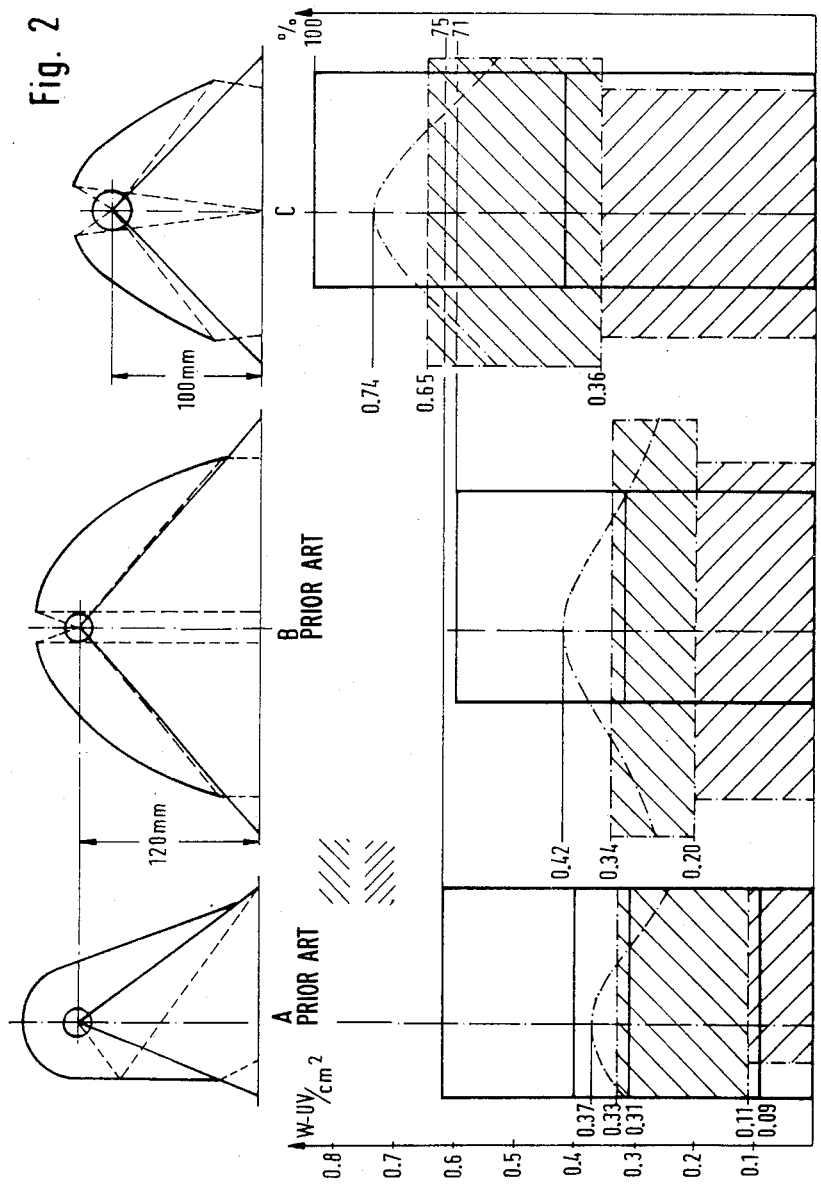
FIG. 2 shows a diagrammatic view of conventional UV radiators and the subject of the invention with a comparison ot the UV radiation efficiency.

In the diagram of FIG. 2, conventional UV radiators A and B, are compared with the device, C, as per the invention with regard to their efficiency, whereby the entire UV radiation or the device, C, is quoted at 100%.

UV radiator A merely achieves 37% or the radiation of C, with UV radiator B registering only 71%. The indirect radiation of A equals only 10% due to the poor reflection of the reflectors, whereas the indirect radiation of the quartz lamp accounts for 27%. As a result of the poor efficiency, two UV radiators of type A have to be arranged in line in order to achieve the required output.

At 71% the performance of UV radiator is better, whereby the indirect radiation accounts for 37.5% and indirect radiation for 33.5%. Overall, when considering the service life of UV radiator B shows the worst result, because the drop in overall performance is particularly high as a result of the high proportion of indirect radiation and the drop in performance mentioned above due to reflector corrosion.

In the case of device C as per the invention, the performance ratio of direct to indirect radiation is almost equal, but does not result in any considerable performance drop as regards indirect radiation, because the reflectors are subjected to practically no wear or corrosion. One fundamental advantage of the device as per the invention lies in the fact that the source of radiation can be located closer to the strip of material thanks to the considerable reduction in visible and I.R. radiation, which increases the effect of the UV radiation.

Figure 3:
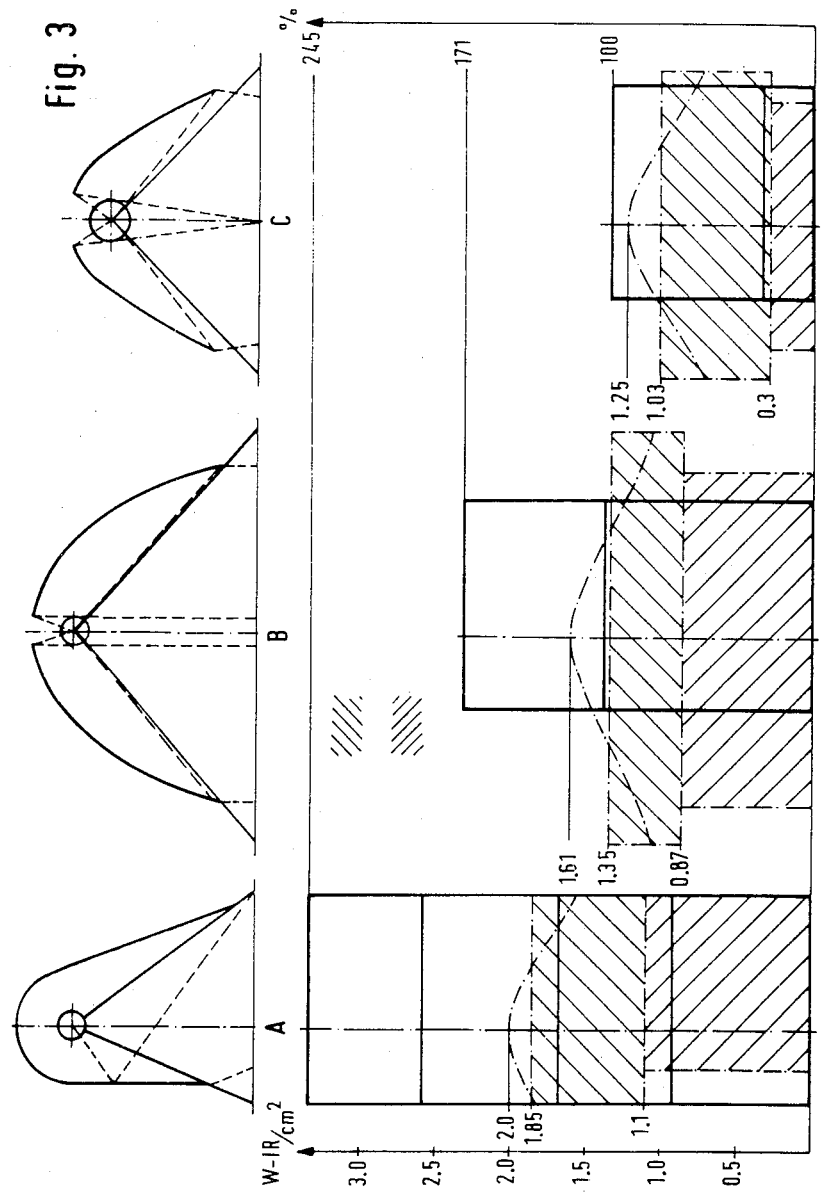
FIG. 3 shows a view similar to that of FIG. 2 but related to the I.R. radiation efficiency.

FIG. 3 shows the comparison illustrated in FIG. 2 with reference to the I.R. radiation, whereby 100% of the I.R. radiation is taken as the basis for device C as per the invention. In this instance, the efficiency of the absorption layer as per the subject of the invention becomes clear. The proportion of indirect radiation for C equals only 24%, whereas the proportion of indirect radiation for A amounts to 68% with 122% being recorded for an overall I.R. radiation in comparison with C.

Since two radiators of type A are required for efficient drying, then this also results in a double I.R. proportion of 245% and an indirect proportion of about 136%. On the bases of the comparison for UV radiation, it also becomes clear that conventional reflectors permit a relatively greater I.R. radation than UV radiation, which means that a large share of the required UV radiation (about 30 to 40%) is not reflected.

In the case of UV radiator B the relationship is even worse. In comparison with C, overall I.R. radiation equals about 171%. Indirect I.R. radiation equals more than 100%, In this instance, is also becomes clear that the indirect I.R. reflection is greater than the indirect UV reflection.

Figure 7:
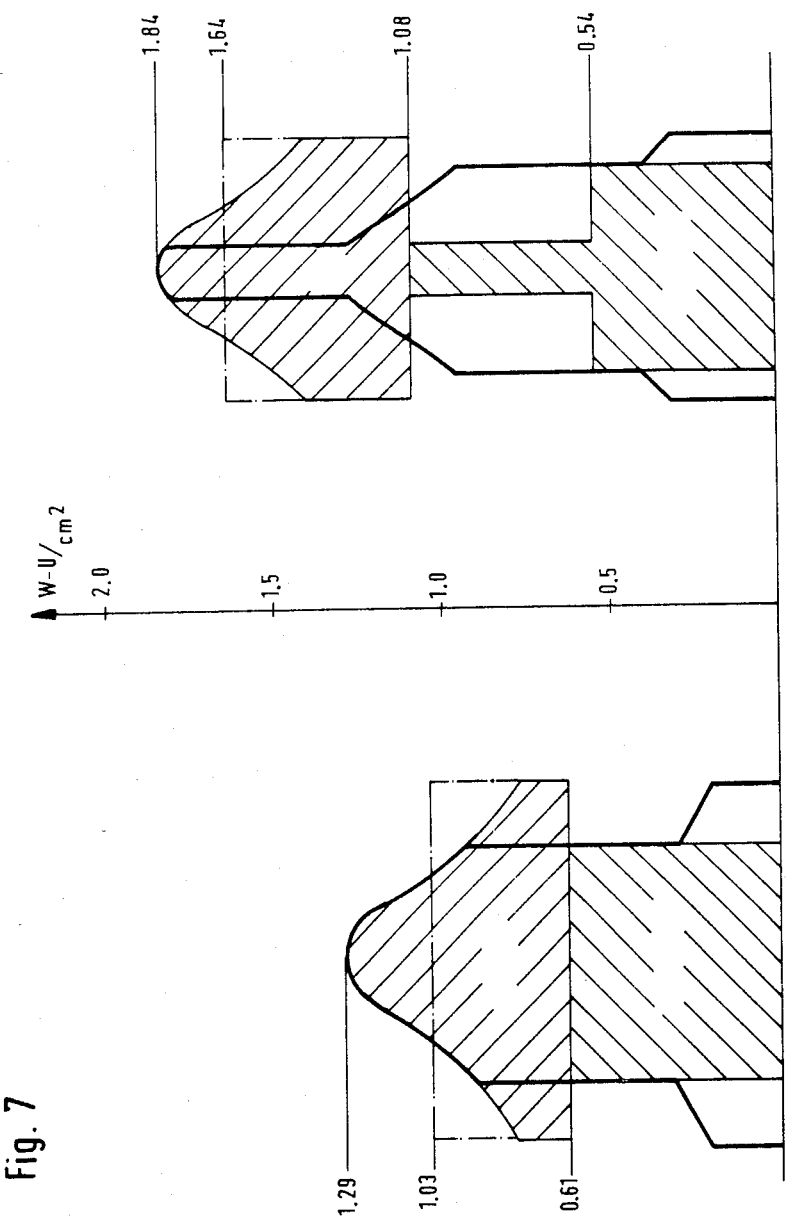
FIGS. 7 and 8 show diagrams in which the radiation intensity of the UV and I.R. radiation with the halfshells at varying angles to each other.
Figure 8:
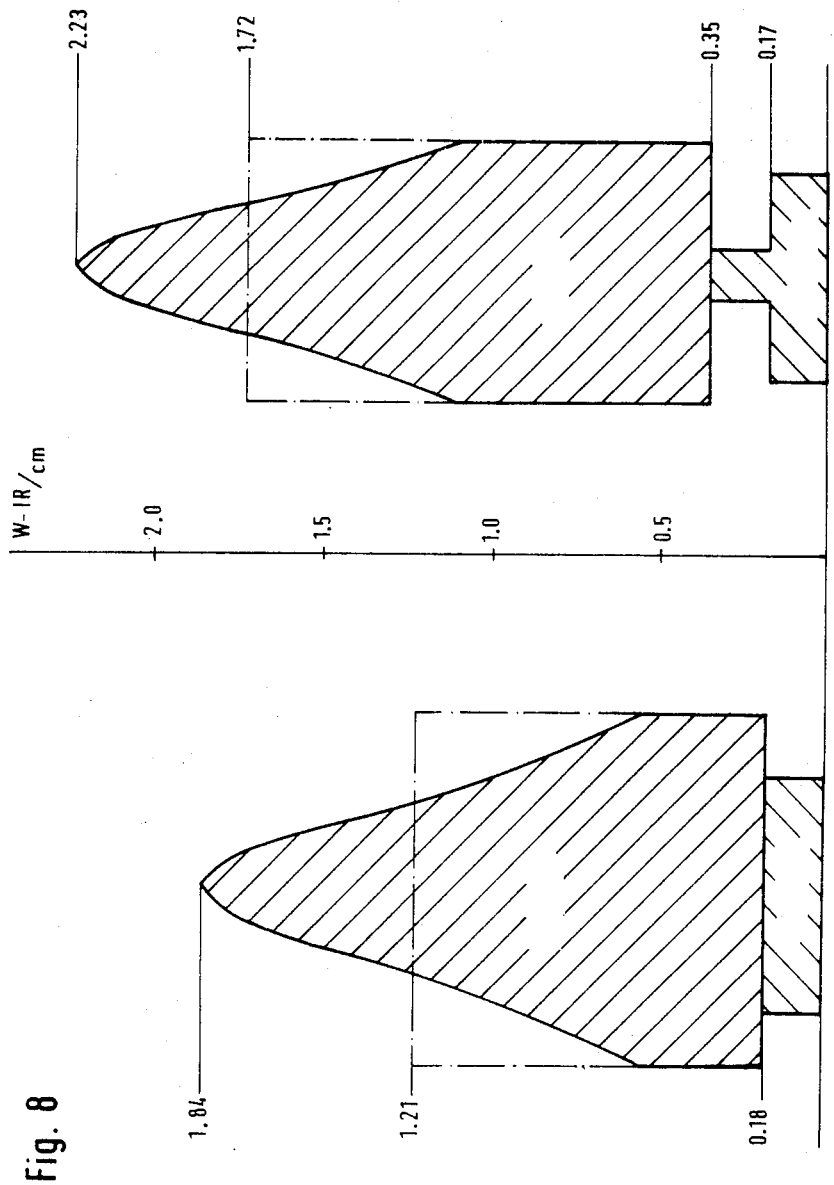

The diagrams in FIGS. 7 and 8 show the effects of UV and I.R. radiation when the reflector shells are placed at different angles to each other (7.5° and 20°). It is well known that the drying of UV printing inks depends less on the exposure time and more on the ability of the UV rays to penetrate the ink layer. A comparison shows that the radiation intensity can be increased substantially by focussing the UV rays with the half-shells inclined at 20°. Due to the considerably improved absorption of I.R. radiation, even when focussed this is still less than the value quoted in FIG. 2 for UV radiator B, whereby the distance between the source of radiation and the printed material is 20% less than for conventional dryers. Attempting to focus conventional UV dryers would result in such high temperatures that the printed material could burst into flames.

The device (1) depicted in FIG. 4 in accordance with the invention comprises a housing (2) and a table (4) over which the printed material (5) is drawn at a speed of 80 m/min. and which is held in a hinged manner. In the upper section of the housing (2) there is a quartz lamp (6) which can be replaced easily. Furhtermore, two parabolic half-shell reflectors (7 and 7') are located in the housing (2). The hollow continuous cast sections comprising "Extrudal 50" aluminium are provided with ducts (8) to carry a coolant such as water or a similar substance. The lower opening of the housing (2) is covered by a quartz glass plate (9). Beneath the quartz glass plate (9) there is a shutter (10) which, with the aid of an appropriate control system and devices not illustrated here, can be drawn quickly in front of the quartz plate (9) when the printing process is interrupted.

The surfaces of the parabolic half-shell reflectors (7 and 7') pointing towards the inside of the housing have an absorption layer (11) consisting of one polished copper and nickel coating each and which is black chromium plated.

Tests have demonstrated that, with respect to all parameters, the black chromium plating of the drawn continually cast sections of "Extrudal 50" aluminium alloy gives the best results, although this does not necessarily mean that the best UV reflection is achieved. The absorption layer (11) must not only ensure good absorption of I.R. radiation, but is must also offer a good base onto which the vapour-deposited quartz layers for the reflection layer (12) can bond. The latter applies to the black chromium plating of drawn aluminium surfaces. After the black chromium plating process the surfaces are dull and without structure, thereby offering a good base for bonding, whereas, for example, nickel plating alone offers an extremely poor bonding base. The reflection layer (12) comprises a total of 66 separate layers, of which the layers with odd numbers consist of hafnium dioxide and the layers with even numbers of silicon dioxide. Each one of these layers has a specific thickness which can be expressed as a multiple of $\lambda/4$, whereby $\lambda$ is the so-called "reference wavelength" which, in this instance, equals 350 nm. The multiples of $\lambda/4$ are, for example, only whole numbers (e.g. 1.00); in the case of numerous layers these equal less than 1.00, and only the final (66th) layer is above 1.00, namely 1.36.

Figure 6:
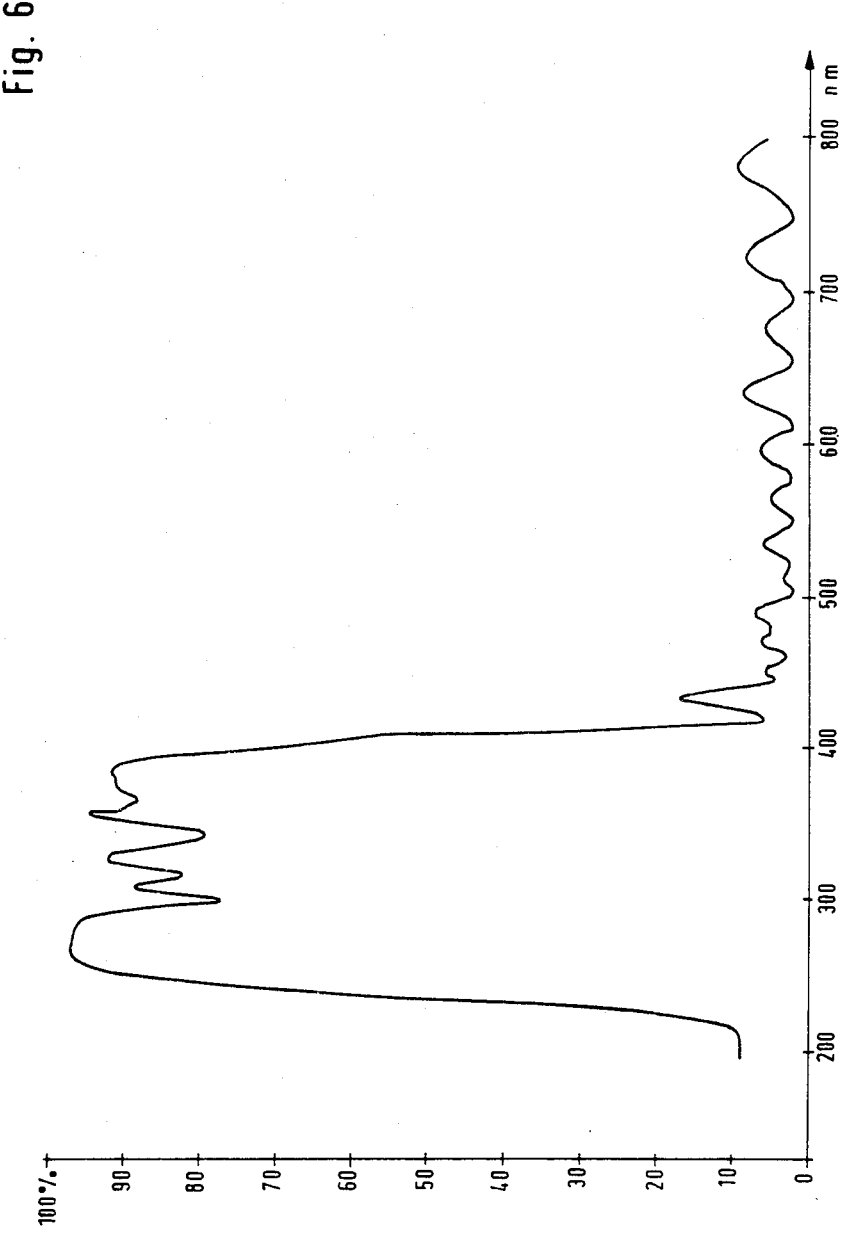
FIG. 6 shows a diagram detailing the reflection behaviour (in %) relative to the wave length.

The resulting reflection curve (FIG. 6) shows quite clearly that in the range from 250 to 400 nm the layer system exhibits a reflection maximum limited by steep edges.

In order to produce the reflection layer, reflector half-shells made from black chromium plated continually cast sections of "Extrudal 50" aluminium alloy were placed on substrate holders inside a vapour-depositing device of type 1100 Q (manufacturer: Leybold-Heraeus GmbH of Hanau, West Germany). The machine was evacuated to a pressure of 10 Pa within the space of six minutes. Subsequently, the substrates were cleaned in a conventional way by means of a glow discharge. Following this, the device was evacuated to a pressure of $5 \times 10^{-3}$ Pa within a further 30 minutes and the substrates were heated to 260° C., after which oxygen was fed in as a dipersion gas until a pressure of $2 \times 10^{-2}$ Pa achieved.

Subsequently, hafnium dioxide (HfO$_2$), which was in an evaportion crucible, was vented for a period of two minutes with an electron-beam gun until the pressure remained stable. Following this, the HfO$_2$ was deposited as sthe first coat and also as a bonding agent at an evaporation of 1.3 nm/sec. The well-known oscillator quartz method was applied to regulate the evaporation rate and to control the diaphragms which can be swung over the evaporators and by means of which the evaporation process for each coat can be interrupted. Following the HfO$_2$ layer, a first SiO$_2$ layer was deposited using another electron-beam gun at an evaporation rate of 1.0 nm/sec., whereby the HfO$_2$ was held at a sufficiently high temperature by feeding in a minor amount of energy. Once the diaphragm for the SiO$_2$ evaporator had closed, this was also held at an increased temperature by feeding in a minor amount of energy, and the electron-beam gun for the HfO$_2$ evaporation was again run up to evaporation power. By repeating this coating procedure in alternating fashion, a total of 66 separate layers were deposited, each of which had a thickness equal to a corresponding multiple of $\lambda/4$, whereby $\lambda$ is the so-called reference wavelength which was selected at 350 nm for the purpose described here. The multiple of $\lambda/4$ mentioned above varied from 0.66 to 1.00 for the second to sixty-fifth layer; for the first layer the figure equalled 0.46 and 1.36 for the sixty-sixth layer of SiO$_2$. During the entire process, the pressure in the vacuum chamber was kept constant. Once the last layer had been applied, the evaporators were switched off and left to cool for five minutes. Then the system was flooded. Measurements taken for the reflection behaviour resulted in the curve in FIG. 6 which shows an excellent reflecting behaviour restricted by steep edges in the intersecting wavelength range between 250 and 400 nm. The layer system adheres very well, is free of cracks and has across the entire range readings between 87 and 97% (reflection). The reading for infrared reflection was only about 5%.

We claim:

1. A device for the treatment of material by UV radiation, comprising a housing having an upper section, an UV and heat radiating lamp in the upper section, the housing having an open lower section through which radiation from the lamp can pass, and a reflector in the housing and reflecting radiation from the lamp through the open lower section, the reflector having a polished metal reflecting surface having a heat-absorbing coating with an outermost surface formed of black chromium plating forming a dull surface, the heat-absorbing coating being covered by UV reflecting composite layers of vapor deposited layers of hafnium dioxide and silicon dioxide of which one is bonded to, said surface of the heat-absorbing coating.

2. The device of claim 1 in which layers of said composite layers are alternating layers of hafnium dioxide and silicon dioxide.

3. The device of claim 1 in which said heat-absorbing coating is formed by layers of copper and nickel which are polished, one nickel layer being outermost and coated with said black chromium plating to which said reflecting composite layer is bonded.

4. The device of claim 3 in which between said metal reflecting surface and said black chromium coating there is located a thin diffusion barrier layer of SiO$_2$ having a thickness of at least 0.5 micron.

5. The device of claim 3 in which said polished metal reflecting surface is aluminum and formed by an aluminum body having fluid cooling passages.

* * * * *